Sept. 28, 1937.    J. W. COLE    2,094,424
WING SWEEP
Filed July 6, 1936
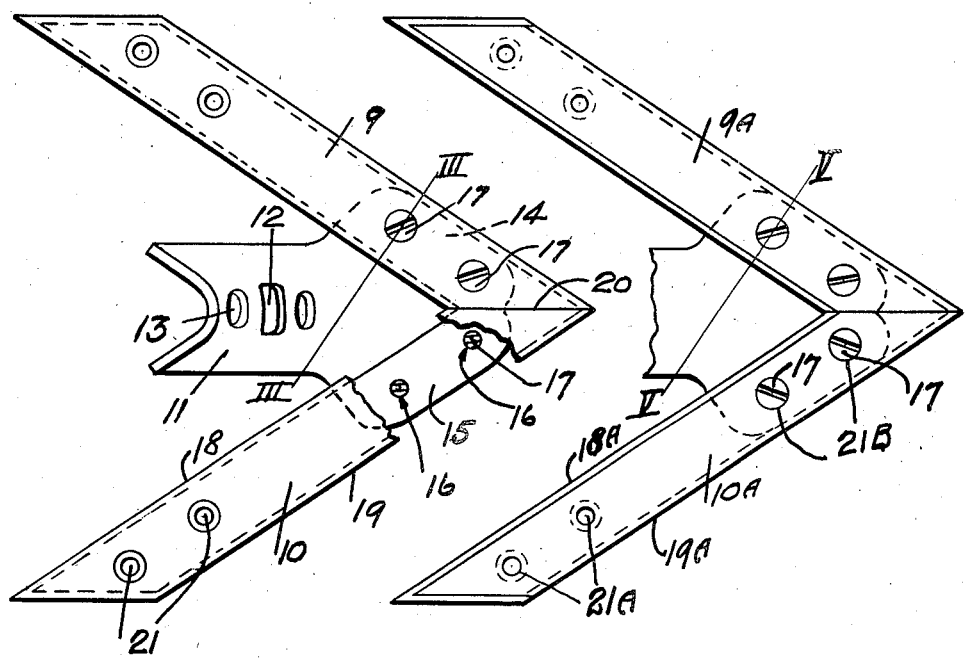
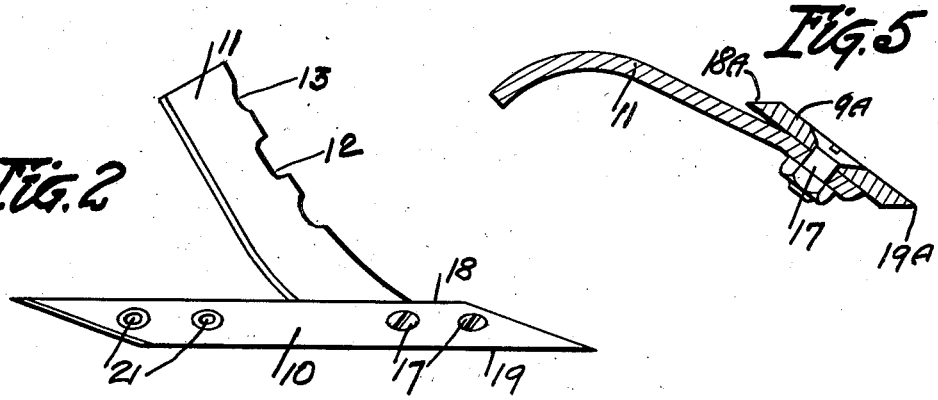
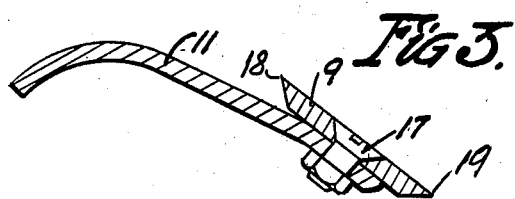

Patented Sept. 28, 1937

2,094,424

UNITED STATES PATENT OFFICE 2,094,424

WING SWEEP

John W. Cole, Memphis, Tenn., assignor of one-half to George S. Hooper, Memphis, Tenn.

Application July 6, 1936, Serial No. 88,964

4 Claims. (Cl. 97—205)

This invention relates to improvements in agricultural implements of the type generally known as sweeps or wing sweeps which are generally used on cultivators or the like type of instrument.

Wing sweeps as heretofore known have been made from a single piece of metal, their shape being such that there is much waste in their construction. In addition, the necessity of a hardened edge which may be sharpened and retain its sharpness is in no way consistent with the necessity of a shank or standard of much softer and tougher material, the extreme slenderness of the shank required in such construction subjecting the shank to strains which hard, brittle metal is not adapted to withstand. In wing sweeps also, it is important the vertical depth of the blade be kept at a minimum, in order that tendency to turn over the earth disturbed, be avoided, and it is found that where the shank forms a continuation of the blade this gives such undesired effect, at least in so far as the center portion of the sweep is concerned, and particularly in the shorter blade sizes, more or less destroys the particular characteristic results which the tool is intended to accomplish.

The objects of the present invention are:

To provide a sweep in which the upper edge of the blade outlines a surface which substantially continuously from end to end is forwardly stepped from the supporting shank;

To provide a sweep having a shank and blade portions secured to the face of the shank whereby the blade portions are forwardly stepped from the shank;

To provide a sweep having a shank and reversible blades attachably secured thereto;

To provide a sweep having a shank and reversible blade secured thereto with the ends of the blades abutting over the middle portion of the shank and tending to brace one the other against displacement; and To provide a blade for such a sweep.

The means by which the foregoing and other objects are accomplished and the manner of their accomplishment, will readily be understood from the following description on reference to the accompanying drawing, in which,—

Fig. 1 is a plan view of my device, showing reversible blades.

Fig. 2 is a side elevation; and

Fig. 3 a double scale section taken as on the line III—III of Fig. 1.

Fig. 4 is a plan view of two assembled blades of modified form; and

Fig. 5 a double scale section on the line V—V of Fig. 4.

Referring now to Figs. 1 to 3 inclusive of the drawing, in which the parts are indicated by numerals, and in which reversible blades 9 and 10 are shown, these blades being rights and lefts, 11 is a shank having holes 12, 13 therein, through which bolts may be placed to fasten the shank as to the standard of a cultivator. The lower portion of the shank is preferably broadened out to form wing portions 14, 15, having holes 16 tapped therein to receive screws, bolts or rivets 17 by means of which the blades 9 and 10 are secured to the shank, the lower part of these wing portions are substantially flat and as will be seen by reference to Figs. 3 and 5 are at a steeper angle than portions thereabove so that the upper edges of the blades 9 and 10 stand away from the shank 11. These blades are flat strips of metal preferably of such composition and carbon content that their opposite edges 18, 19 may be sharpened and hold such sharpening, this sharpening being done as by bevelling. Each of the blades is cut diagonally at one or both of its ends, these cuts being so bevelled that when a pair of the blades are assembled and secured on the shank, an end of one blade snugly abuts an end of the opposing blade along a surface 20 substantially on a plane through the center of the shank. Both ends of each blade may be bevelled in a similar manner, as well as the two side edges of the blade so that the blades may be turned end for end and secured in either position in place. At both ends of the blades are holes 21 conforming in spacing to the holes 16 of the shank, so that with a turn of either end of the blade inward, the blade may be secured in place. The blades thus described are rights and lefts so that two otherwise similar blades are required for each sweep, each of these blades being reversible on its own side of the sweep. In such case the bevelled edges 18 and 19 of the blade will be as shown in Fig. 3, the upper edge 18 of each blade standing well away from the shank across the entire front of the shank.

Figs. 4 and 5 show a modification in which the two blades 9A, 10A are identical and reversal is accomplished by shifting sides of the two blades. In this form of blade the holes 21A at one end of the blade are countersunk from one face while the holes 21B at the other end are countersunk from the opposite side, the edge bevelling 18A, 19A to sharpen the blade likewise being on opposite faces of the blades and the end bevels similarly opposed. In Fig. 5 it will be seen that while this type reduces slightly the spacing of the edge 18A from the shank the spacing is definite and continuous across the face of the shank.

It will be understood that where right and left hand blades are employed, unless they are to be reversed, only one side edge and one end edge need be bevelled and that in such event the holes through which attaching screws or bolts are passed need only be adjacent such two bevelled edges.

It will be noted in all of the types or modifications of the blade, that an edge and an end bevel which cut away the same face of the blade, intersect at each acutely pointed corner of the blade and that the two holes for the attaching screws which lie adjacent such acute point are countersunk from the opposite face of the blade.

With the right and left types of blades, after one edge becomes dull and two blades are turned end for end and secured in place whereas with the pair of blades of single blade type, the blades are shifted from side to side and secured.

It will be understood also that a shank of the general type shown may be used with a continuous blade, symmetrically disposed with respect to such shank, provided such blade overlies the front of the shank and a continuous breaking edge extending from end to end of such blade, is maintained in front of the shank.

What I claim is:

1. A wing-sweep blade for use as with a complementary blade, said wing-sweep blade comprising a narrow, relatively elongated, flat blade having parallel edges, said blade having its ends cut along substantially parallel lines to form each an acute angle with an intersecting edge, each said end and its said intersecting edge being bevelled to undercut said edge and end from the same face of said blade, whereby to sharpen said edge and adapt said end to abut against and cooperate with a said complementary blade, said wing sweep blade having holes adjacent each said end to receive attaching means, as screws.

2. A wing-sweep blade for use as with a complementary blade, said wing-sweep blade comprising a narrow, relatively elongated, flat blade having parallel edges, said blade having its ends cut along substantially parallel lines to form each an acute angle with an intersecting edge, each said end and its said intersecting edge being bevelled to undercut said edge and end from the same face of said blade, whereby to sharpen said edge and adapt said end to abut against and cooperate with a said complementary blade, said wing-sweep blade having holes adjacent each of its said ends adapted to receive attaching means, as screws, said holes at each said blade-end, being countersunk from that face of said blade which at such end is undercut.

3. In a wing sweep, a shank substantially symmetrical about a fore and aft vertical plane, the lower portion of said shank having a pair of substantially flat seating surfaces each at substantially steeper angle than the adjacent shank portion thereabove, and a pair of narrow relatively elongated and symmetrically disposed blades detachably secured respectively against said seating surfaces with the inner ends of said blades abutting and said blades extending across said faces and therebeyond.

4. In a wing sweep, a shank substantially symmetrical about a fore and aft vertical plane, the lower portion of said shank having a pair of substantially flat seating surfaces at substantially steeper angles than the adjacent shank portions thereabove, and a pair of narrow relatively elongated and symmetrically disposed blades detachably secured respectively against said seating surfaces with the inner ends of said blades abutting, said blades being at least as wide as the height of said faces and extending therebeyond.

JOHN W. COLE.